(12) United States Patent
Ma et al.

(10) Patent No.: US 11,630,378 B2
(45) Date of Patent: Apr. 18, 2023

(54) LASER PROJECTION APPARATUS

(71) Applicant: Hisense Laser Display Co., Ltd., Shandong (CN)

(72) Inventors: Mingchen Ma, Shandong (CN); Liang Yin, Shandong (CN)

(73) Assignee: HISENSE LASER DISPLAY CO., LTD., Shandong (CN)

( * ) Notice: Subject to any disclaimer, the term of this patent is extended or adjusted under 35 U.S.C. 154(b) by 200 days.

(21) Appl. No.: 17/283,204

(22) PCT Filed: Jul. 29, 2020

(86) PCT No.: PCT/CN2020/105531
§ 371 (c)(1),
(2) Date: Apr. 6, 2021

(87) PCT Pub. No.: WO2021/098278
PCT Pub. Date: May 27, 2021

(65) Prior Publication Data
US 2022/0308427 A1    Sep. 29, 2022

(30) Foreign Application Priority Data

Nov. 19, 2019   (CN) .......................... 201911136274.2

(51) Int. Cl.
*G03B 21/20*        (2006.01)
*H04N 9/31*         (2006.01)
(Continued)

(52) U.S. Cl.
CPC ......... *G03B 21/008* (2013.01); *G03B 21/142* (2013.01); *G03B 21/2033* (2013.01)

(58) Field of Classification Search
CPC .............. G03B 21/2066; G03B 21/208; G03B 21/2033; G03B 21/008; H04N 9/3152; H04N 9/3161
See application file for complete search history.

(56) References Cited

U.S. PATENT DOCUMENTS

2008/0259287 A1   10/2008   Liao et al.
2010/0045938 A1    2/2010   Lin et al.
(Continued)

FOREIGN PATENT DOCUMENTS

CN      1779551 A      5/2006
CN    101655607 A      2/2010
(Continued)

OTHER PUBLICATIONS

Written Opinion and International Search Report issued in corresponding International Application No. PCT/CN2019/122868 dated Mar. 5, 2020, with English translation.
(Continued)

*Primary Examiner* — Ryan D Howard
(74) *Attorney, Agent, or Firm* — Morgan, Lewis & Bockius LLP

(57) ABSTRACT

A laser projection apparatus includes a laser source, an optical engine and a projection lens. The optical engine includes a light pipe, a lens assembly, a reflector, a prism assembly and a digital micromirror device. An optical axis of the illumination beam transmitted by the light pipe and the lens assembly is a first optical axis. An optical axis of an illumination beam reflected by the reflector to the prism assembly is a second optical axis. The first optical axis is perpendicular to the second optical axis, and both the first optical axis and the second optical axis are parallel to the beam receiving face of the digital micromirror device.

20 Claims, 4 Drawing Sheets

(51) Int. Cl.
*G03B 21/00* (2006.01)
*G03B 21/14* (2006.01)

(56) References Cited

U.S. PATENT DOCUMENTS

| | | |
|---|---|---|
| 2011/0043932 A1 | 2/2011 | Nomura et al. |
| 2013/0182230 A1 | 7/2013 | Lin et al. |
| 2014/0104585 A1 | 4/2014 | Kadotani et al. |
| 2016/0119595 A1* | 4/2016 | Lyubarsky ......... G02B 27/0961 353/121 |
| 2018/0284395 A1 | 10/2018 | Chien et al. |

FOREIGN PATENT DOCUMENTS

| | | |
|---|---|---|
| CN | 101673036 A | 3/2010 |
| CN | 101925842 A | 12/2010 |
| CN | 202251653 U | 5/2012 |
| CN | 102809879 A | 12/2012 |
| CN | 102841491 A | 12/2012 |
| CN | 103867638 A | 6/2014 |
| CN | 104455153 A | 3/2015 |
| CN | 104656350 A | 5/2015 |
| CN | 105589285 A | 5/2016 |
| CN | 205721053 U | 11/2016 |
| CN | 106842510 A | 6/2017 |
| CN | 1069900658 A | 7/2017 |
| CN | 107300745 A | 10/2017 |
| CN | 206627683 U | 11/2017 |
| CN | 107450259 A | 12/2017 |
| CN | 108508569 A | 9/2018 |
| CN | 108803219 A | 11/2018 |
| EP | 0 195 868 A1 | 10/1986 |
| EP | 2 290 177 A2 | 3/2010 |
| JP | 2002-48960 A | 2/2002 |
| JP | 2008-268865 A | 11/2008 |
| JP | 2012-2873 A | 1/2012 |
| KR | 2005/0080605 A | 8/2005 |
| TW | 200912419 A | 3/2009 |
| TW | 201329516 A1 | 7/2013 |
| TW | 201939083 A | 10/2019 |
| WO | 2017/169236 A1 | 10/2017 |

OTHER PUBLICATIONS

International Search Report and Written Opinion issued in corresponding International Application No. PCT/CN2020/105531 dated Sep. 28, 2020, with English translation.
International Search Report and Written Opinion issued in corresponding International Application No. PCT/CN2020/105532 dated Oct. 14, 2020, with English translation.
Office Action issued in corresponding Chinese Patent Application No. 201911136299.2 dated Sep. 24, 2021, with English translation.
Office Action issued in corresponding Chinese Patent Application No. 201911136274.2 dated Sep. 28, 2021, with English translation.

* cited by examiner

LASER PROJECTION APPARATUS

This application is a national phase entry under 35 USC 371 of International Patent Application No. PCT/CN2020/105531 filed on Jul. 29, 2020, which claims priority to Chinese Patent Application No. 201911136274.2, filed with the Chinese Patent Office on Nov. 19, 2019, which are incorporated herein by reference in their entirety.

TECHNICAL FIELD

The present disclosure relates to the field of display technologies, and in particular, to a laser projection apparatus.

BACKGROUND

A laser projection apparatus is a projection apparatus using laser beams as a laser source, and generally includes a laser source assembly, an illumination assembly and an imaging assembly. Laser beams generated by the laser source assembly enter the imaging assembly after passing through the illumination assembly, and images may be displayed on an object such as a screen or a wall by means of the imaging assembly.

The laser source assembly may typically include a laser array, and the imaging assembly may typically include a projection lens. The illumination assembly may typically include a plurality of lenses, a plurality of prisms, and at least one Digital Micromirror Device (DMD). The laser beams emitted by the laser source assembly sequentially enter the plurality of lenses and the plurality of prisms, and are then projected on the Digital Micromirror Device for image signal modulation, and are finally reflected by the Digital Micromirror Device to the projection lens and projected to form images through the projection lens.

SUMMARY

Some embodiments of the present disclosure provide a laser projection apparatus. The laser projection apparatus includes: a laser source configured to provide an illumination beam; an optical engine configured to modulate the illumination beam according to an image signal to form a projection beam; and a lens configured to project the projection beam for imaging. The optical engine includes: a light pipe, a lens assembly, a reflector, a prism assembly and a digital micromirror device. The light pipe is configured to receive and homogenize the illumination beam. The lens assembly is configured to first amplify and next converge the homogenized illumination beam, and then transmit the homogenized illumination beam to the reflector. The reflector is configured to reflect the illumination beam to the prism assembly. The digital micromirror device includes a beam receiving face facing the prism assembly, and is configured to modulate the illumination beam according to the image signal to form the projection beam. The prism assembly is configured to transmit the illumination beam to the beam receiving face of the digital micromirror device, and receive the projection beam reflected by the beam receiving face, and transmit the projection beam to the projection lens. An optical axis of illumination beam transmitted by the light pipe and the lens assembly is a first optical axis. An optical axis of the illumination beam reflected by the reflector to the prism assembly is a second optical axis. The first optical axis is perpendicular to the second optical axis, and both the first optical axis and the second optical axis are parallel to the beam receiving face of the digital micromirror device.

BRIEF DESCRIPTION OF THE DRAWINGS

In order to describe technical solutions of the present disclosure more clearly, the accompanying drawings to be used in the description of some embodiments will be introduced briefly. Obviously, the accompanying drawings to be described below are merely some embodiments of the present disclosure, and a person of ordinary skill in the art can obtain other drawings according to those drawings. In addition, the drawings in the following description may be regarded as schematic diagrams, and are not intended to limit the actual size of the product according to the embodiments of the present disclosure.

DETAILED DESCRIPTION

To make the purpose, the technical solutions, and advantages of the present application clearer, the embodiments of the present application will be described in further detail below in combination with the accompanying drawings. Obviously, the described embodiments are merely some but not all embodiments of the present disclosure. All other embodiments obtained by a person of ordinary skill in the art on the basis of the embodiments of the present disclosure shall be included in the protected scope of the present disclosure.

Unless the context requires otherwise, throughout the specification and claims which follow, the word "comprise" and variations thereof, such as, "comprises" and "comprising" are to be construed in an open, inclusive sense, that is as "including, but not limited to."

In the description of the specification, references made to the term "one embodiment," "some embodiments," and "exemplary embodiments," "example," and "specific example," or "some examples" and the like are intended to refer that specific features and structures, materials or characteristics described in connection with the embodiment or example that are included in at least one embodiment or example of the present disclosure. The schematic expression of the terms does not necessarily refer to the same embodiment or example. Moreover, the specific features, structures, materials or characteristics described may be included in any suitable manner in any one or more embodiments or examples.

In addition, the terms "first" and "second" are for illustration purposes only and are not to be construed as indicating or implying relative importance or implied reference to the quantity of indicated technical features. Thus, features defined by the terms "first" and "second" may explicitly or implicitly include one or more of the features.

In the description of the present disclosure, the meaning of "plural" is two or more unless otherwise specifically and specifically defined.

Furthermore, phrase "at least one of A, B, and C" includes the following combinations of A, B, and C: only A, only B, only C, a combination of A and B, a combination of A and C, a combination of B and C, and a combination of A, B, and C. The expression of A and/or B includes the following combinations: only A, only B, and A and B.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Figure 1:
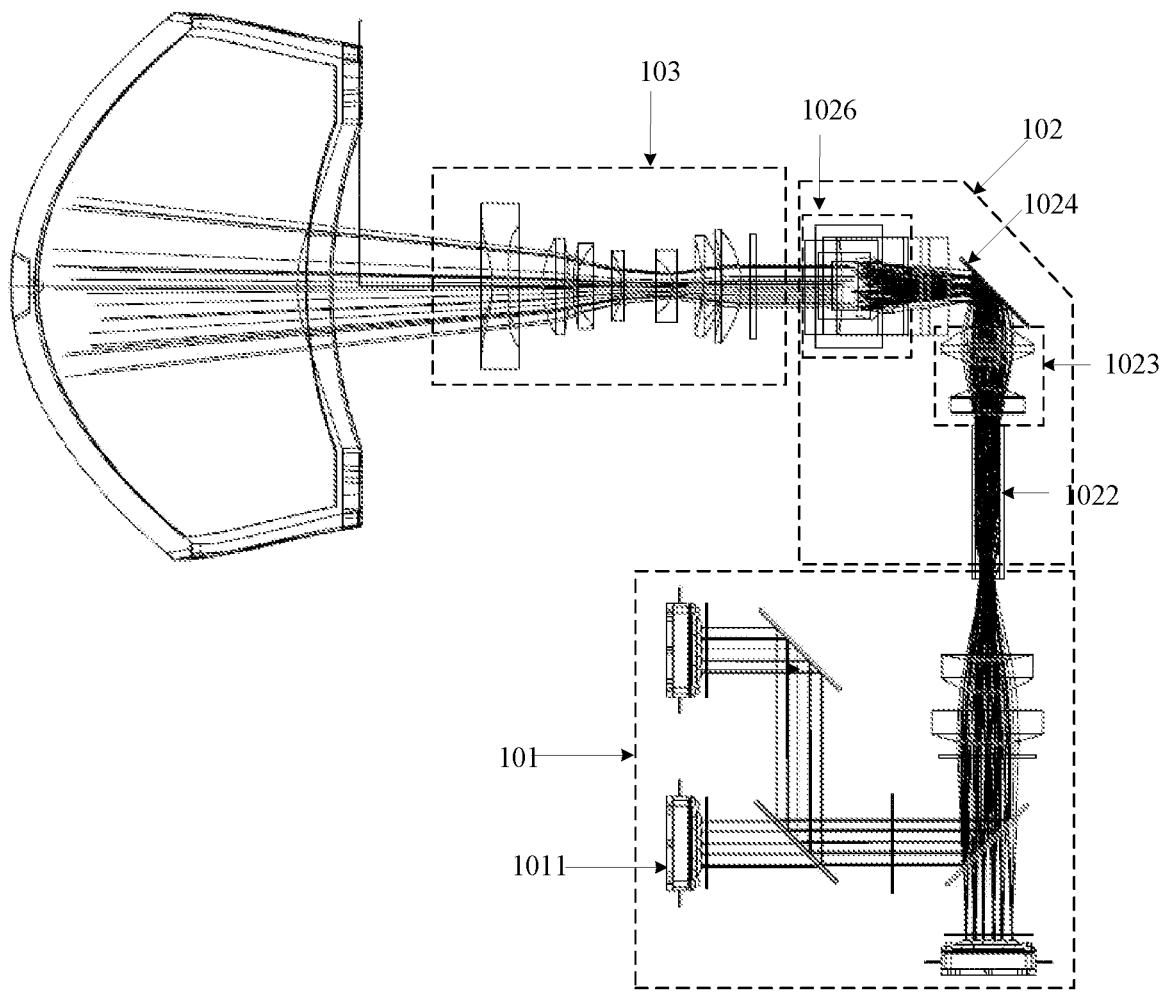
FIG. 1 is a schematic diagram showing a simplified structure of a laser projection apparatus, according to some embodiments of the present disclosure.
Figure 2:
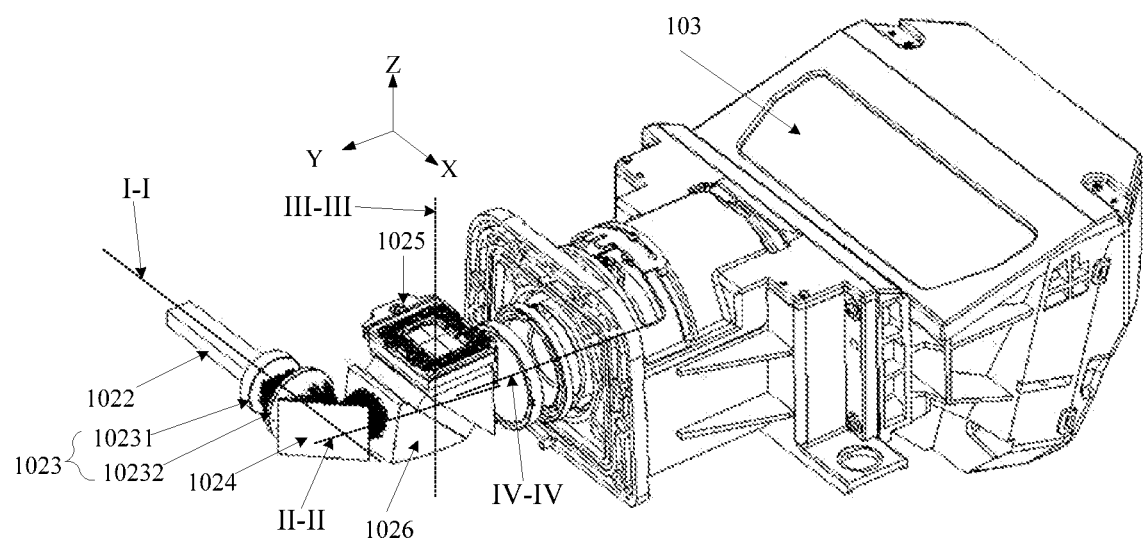
FIG. 2 is a schematic diagram showing a structure of an optical engine and a projection lens in the laser projection apparatus in FIG. 1.

FIG. 1 is a schematic diagram showing a simplified structure of a laser projection apparatus according to some embodiments of the present disclosure. FIG. 2 is a schematic diagram showing a structure of an optical engine and a projection lens in the laser projection apparatus in FIG. 1. Referring to FIGS. 1 and 2, the laser projection apparatus may include: a laser source 101, an optical engine 102 and a projection lens 103. The laser source 101 is configured to provide illumination beams (laser beams). The optical engine 102 is configured to modulate the illumination beams provided by the laser source 101 with image signals to obtain projection beams. The projection lens 103 may be used to project the projection beams on a screen or a wall for imaging.

Referring to FIG. 1, the laser source 101 may include three laser arrays 1011. The three laser arrays 1011 may be a red laser array, a green laser array, and a blue laser array. That is, the laser source 101 is a tri-color laser source, but is not limited thereto. The three laser arrays 1011 may also be all blue laser arrays, or two blue laser arrays and one red laser array.

In some embodiments, the laser source 101 may further include two laser arrays 1011 (a dual-color laser source) or one laser array 1011 (a mono-color laser source). In the dual-color laser source, the two laser arrays 1011 may be a blue laser array and a red laser array. In the mono-color laser source, the one laser array 1011 may be a blue laser array. In some embodiments, the two laser arrays 1011 included in the laser source 101 may both be blue laser arrays.

In a case where the laser source 101 includes only the blue laser array(s), or only the blue laser array(s) and the red laser array, the laser source 101 may further include a phosphor wheel and a color filter wheel. After a blue laser array emits blue laser beams, some of the blue laser beams hit the phosphor wheel to produce red fluorescence beams (in a case where the laser source 101 includes the red laser array, the red fluorescence beams do not need to be generated) and green fluorescence beams. Then, the blue laser beams, the red fluorescence beams (or red laser beams) and the green fluorescence beams may be filtered through the color filter wheel, and then beams of three primary colors are sequentially output. According to a trichromatic mixing principle, the human eyes are unable to distinguish different colors of the beams at a certain time, and what are perceived by the human eyes are still mixed white beams.

The illumination beams emitted by the laser source 101 enters the optical engine 102. Referring to FIGS. 1 and 2, the optical engine 102 may include: a light pipe 1022, a lens assembly 1023, a reflector 1024, a Digital Micromirror Device (DMD) 1025 and a prism assembly 1026. The light pipe 1022 may receive the illumination beams provided by the laser source 101 and homogenize the illumination beams. The lens assembly 1023 may first amplify the illumination beams homogenized by the light pipe 1022, then converge the illumination beams and emit the illumination beams to the reflector 1024. The reflector 1024 may reflect the illumination beams that are first amplified and then converged by the lens assembly 1023 to the prism assembly 1026. Beams passing through the prism assembly 1026 finally enter the projection lens 103.

In the optical engine 102, the DMD 1025 is a core component, which plays a role of modulating the illumination beams provided by the laser source 101 through the image signals. That is, the DMD 1025 controls the illumination beams to display different colors and luminance according to different pixels of an image to be displayed, so as finally to form an optical image. Therefore, the DMD 1025 is also referred to as an optical modulator or a light valve. Depending on whether the optical modulator (or the light valve) transmits or reflects the illumination beams, the optical modulator (or the light valve) may be classified as a transmissive optical modulator (or light valve) or a reflective optical modulator (or light valve). For example, the Digital Micromirror Device 1025 shown in FIGS. 1 and 2 reflects the illumination beams; therefore, the Digital Micromirror Device 1025 is a reflective optical modulator. In another example, a liquid crystal light valve transmits the illumination beams; therefore, the liquid crystal light valve is a transmissive optical modulator. In addition, according to the number of the optical modulators (or the light valves) used in the optical engine, the optical engine may be classified into a single-chip system, a double-chip system, or a three-chip system. For example, In a case where only one Digital Micromirror Device 1025 is used in the optical engine 102 shown in FIGS. 1 and 2, the optical engine 102 may be referred to as a single-chip system. In a case where three Digital Micromirror Devices are used, the optical engine may be referred to as a three-chip system.

Figure 3:
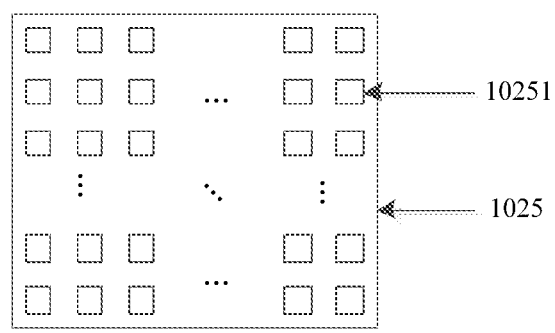
FIG. 3 is a schematic diagram of an arrangement of micromirrors in a Digital Micromirror Device in the optical engine in FIG. 2.
Figure 4:
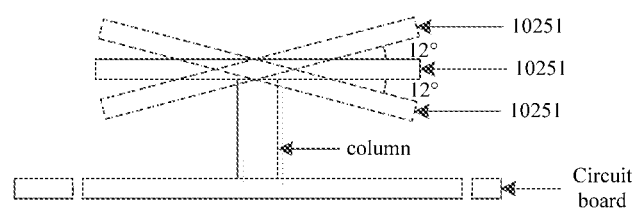
FIG. 4 is a schematic diagram of a swing position of a micromirror in the Digital Micromirror Device shown in FIG. 3.

The Digital Micromirror Device is applied to a Digital Light Processing (DLP) projection architecture. The optical engine shown in FIGS. 1 and 2 uses the DLP projection architecture. As shown in FIG. 3, the DMD 1025 includes, for example, thousands of micromirrors that may be individually driven to deflect. These micromirrors are arranged in an array, and each micromirror corresponds to one pixel in an image to be displayed. In the DLP projection architecture, each micromirror is equivalent to a digital switch. In an example shown in FIG. 4, the micromirror may swing by a range of plus or minus 12 degrees (i.e., ±12°) or a range of plus or minus 17 degrees (i.e., ±17°) under the action of an external electric field. Image signals are processed and converted into digital codes such as 0 and 1, and these digital codes may drive the micromirrors to swing. By controlling an orientation of each micromirrors in the DMD through the image signals, the luminance and color of a pixel corresponding to a micromirror may be controlled, and a purpose of modulating the illumination beams projected onto the DMD may be achieved.

The light pipe 1022, the lens assembly 1023 and the reflector 1024 in front of the DMD 1025 form an illumination beam path. After passing through the illumination beam path, the illumination beams emitted by the laser source 101 are made to conform to an illumination size and an angle of incidence required by the DMD 1025.

As shown in FIG. 1, the projection lens 103 includes a combination of a plurality of lens, the combination of a plurality of lens is usually divided by group, and is divided into a three-segment combination including a front group, a middle group and a rear group, or a two-segment combination including a front group and a rear group. The front group is a lens group proximate to a laser-emitting side (a left side shown in FIG. 1) of the laser projection apparatus, and the rear group is a lens group proximate to a laser-emitting side (a right side shown in FIG. 1) of the optical engine 102. According to the plurality of combinations of the lens groups described above, the projection lens 103 may also be a zoom lens, or a prime adjustable-focus lens, or a prime lens. In some embodiments, the laser projection apparatus is an ultra-short-focus projection apparatus. The projection lens 103 is an ultra-short-focus projection lens, and a projection ratio of the projection lens 103 is usually less than 0.3, such as 0.24.

Figure 5:
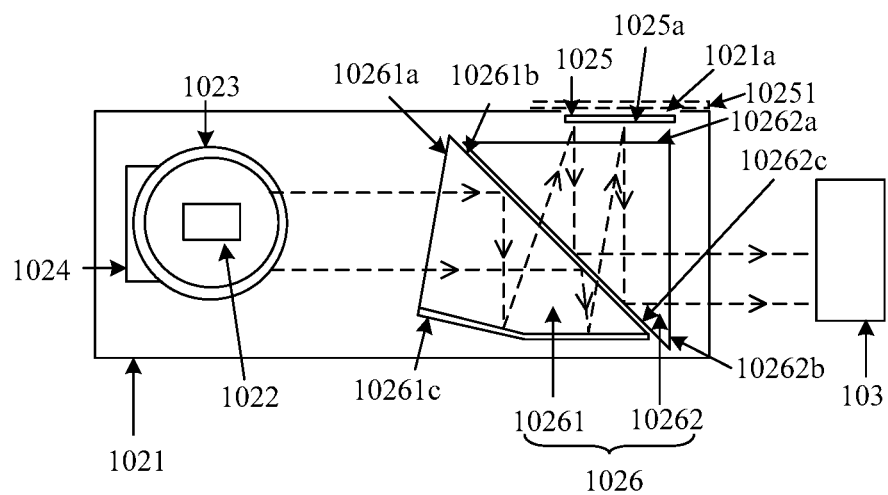
FIG. 5 is a schematic diagram showing a structure of a beam path of a laser projection apparatus, according to some embodiments of the present disclosure.
Figure 6:
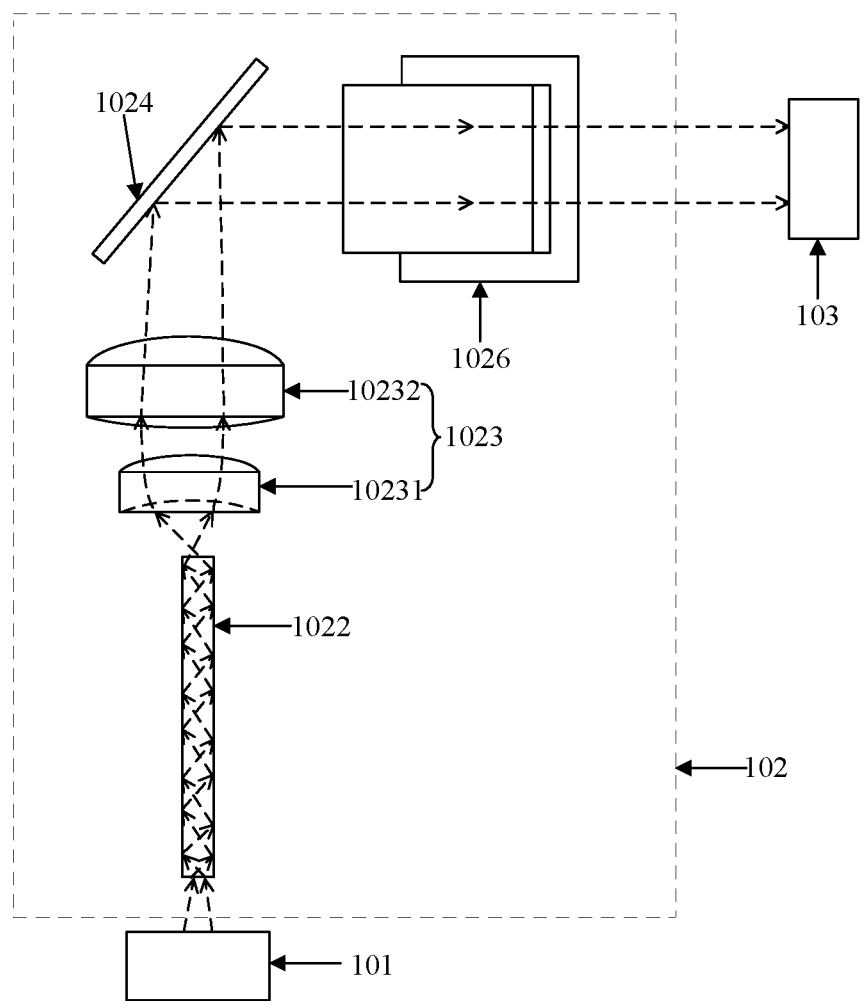
FIG. 6 is a top view of the schematic diagram of the structure of the beam path shown in FIG. 5.

FIG. 5 is a schematic diagram showing a structure of a beam path of a laser projection apparatus according to some embodiments of the present disclosure. FIG. 6 is a top view of the schematic diagram of the structure of the beam path shown in FIG. 5. Referring to FIGS. 5 and 6, the optical engine 102 further includes a housing 1021. The light pipe 1022, the lens assembly 1023, the reflector 1024, the DMD 1025, and the prism assembly 1026 may all be located in a cavity enclosed by the housing 1021. In FIG. 2, the housing 1021 is omitted to make an internal structure of the optical engine 102 clearer.

For convenience of description, an inside of the cavity enclosed by the housing 1021 is simply referred to as an inside of the housing 1021, and an outside of the cavity enclosed by the housing 1021 is simply referred to as an outside of the housing 1021. Referring to FIGS. 2, 5 and 6, the light pipe 1022, the lens assembly 1023 and the reflector 1024 are located at a bottom side of the inside of the housing 1021 (for example, the bottom side refers to a lower space of the inside of the housing 1021 in a direction shown by a Z-axis in FIG. 2), and geometric centers of the light pipe 1022, the lens assembly 1023, and the reflector 1024 are approximately in a same plane. The DMD 1025 is located at a top side of the inside of the housing 1021 (for example, the top side refers to an upper space of the inside of the housing 1021 in the direction shown by the Z-axis in FIG. 2).

As shown in FIG. 5, at the top side of the inside of the housing 1021, the DMD 1025 is disposed opposite the prism assembly 1026. The prism assembly 1026 is located at a side of the DMD 1025 away from the top side of the inside of the housing 1021. That is, in a Z-axis direction shown in FIG. 2, the prism assembly 1026 is located below the DMD 1025, and beam receiving faces 1025a of the plurality of micromirrors included in the DMD 1025 face the prism assembly 1026.

Of course, it should be understood that the DMD 1025 may also be disposed outside the housing 1021. In this case, as shown in FIG. 5, the housing 1021 may further include an opening 1021a, and the opening 1021a may expose a beam receiving face 1025a of the DMD 1025 to the inside of the housing 1021.

Referring to FIGS. 5 and 6, when illumination beams from the laser source 101 enter the optical engine 102, the illumination beams first enter the light pipe 1022, and are homogenized by the light pipe 1022, and are then amplified first and converged next by the lens assembly 1023 to have an illumination size required by the beam receiving face 1025a of the DMD 1025. Afterwards, the illumination beams enter the reflector 1024, and are reflected by the reflector 1024 to the prism assembly 1026. The illumination beams entering the prism assembly 1026 are first reflected by the prism assembly 1026 to the beam receiving face 1025a of the DMD 1025, then modulated by the beam receiving face 1025a into projection beams corresponding to the image signals and the projection beams are reflected to the prism assembly 1026. Then the projection beams are reflected by the prism assembly 1026 to the projection lens 103, and finally projected by the projection lens 103 for imaging.

Referring to FIGS. 2, 5 and 6, the illumination beams from the laser source 101 sequentially enter the light pipe 1022 and the lens assembly 1023. Since propagation directions of the illumination beams in the light pipe 1022 and the lens assembly 1023 are the same, optical axes of the illumination beams in the light pipe 1022 and the lens assembly 1023 are a same optical axis. Herein, this optical axis is referred to as a first optical axis I-I. In some embodiments, the first optical axis I-I passes through geometric centers of the light pipe 1022 and the lens assembly 1023. Illumination beams exiting from the lens assembly 1023 are projected onto the beam receiving face 1025a of the DMD 1025 after sequentially skimming over the reflector 1024 and passing through the prism assembly 1026, and are then reflected by the beam receiving face 1025a of the DMD 1025 onto the prism assembly 1026. Herein, an optical axis of the illumination beams reflected by the reflector 1024 to the prism assembly 1026 is referred to as a second optical axis II-II, and an optical axis of projection beams (in this case, the illumination beams are modulated into projection beams by means of the DMD 1025) reflected by the beam receiving face 1025a of the DMD 1025 to the prism assembly 1026 is referred to as a third optical axis III-III. Thereafter, the prism assembly 1026 reflects the received projection beams reflected by the beam receiving face 1025a of the DMD 1025 to the projection lens 103. Herein, an optical axis of the projection lens 103 is referred to as a fourth optical axis IV-IV. In some embodiments, the fourth optical axis IV-IV passes through a geometric center of the projection lens 103.

Referring to FIG. 2, an X-axis, a Y-axis and the Z-axis are perpendicular to each other. An extending direction of the first optical axis I-I is parallel to the X-axis, extending directions of the second optical axis II-II and the fourth optical axis IV-IV are parallel to the Y-axis, and an extending direction of the third optical axis III-III is parallel to the Z-axis. That is, in some embodiments of the present disclosure, the first optical axis I-I, the second optical axis II-II, the third optical axis III-III and the fourth optical axis IV-IV satisfy the following relationship. The first optical axis I-I is perpendicular to the second optical axis II-II. The second optical axis II-II is perpendicular to the third optical axis III-III. The first optical axis I-I is perpendicular to the third optical axis III-III but does not intersect the third optical axis III-III. The third optical axis III-III is perpendicular to the fourth optical axis IV-IV. Moreover, both the first optical axis I-I and the second optical axis II-II are parallel to the beam receiving face 1025a of the digital micromirror device 1025.

Referring to FIG. 2 again, since the first optical axis I-I is perpendicular to the second optical axis II-II and both the first optical axis I-I and the second optical axis II-II are parallel to the beam receiving face 1025a of the digital micromirror device 1025, the laser projection apparatus according to some embodiments of the present disclosure makes full use of spaces in extending directions of the X-axis, the Y-axis and the Z-axis, comparing a structure which has the light pipe 1022, the lens assembly 1023 and the DMD 1024 arranging along a line one after one. Therefore, sizes of the laser projection apparatus in extending directions of the X-axis and the Y-axis would not be large. A structure of the laser projection apparatus is more compact. Space occupied by the laser projection apparatus is getting smaller.

In some embodiments, the second optical axis II-II is parallel to the fourth optical axis IV-IV, and there is a certain distance (the distance is greater than or equal to zero) between the second optical axis II-II and the fourth optical axis IV-IV. In some embodiments, the second optical axis II-II intersects the fourth optical axis IV-IV, and there is an included angle (the included angle is greater than or equal to zero) between the second optical axis II-II and the fourth optical axis IV-IV. In some embodiments, "parallel" refers to an included angle of two axes to be no more than a reference angle (for example, the reference angle is 5 degrees); "perpendicular" refers to a complementary angle of an included angle of two axes to be no more than a reference angle (for example, the reference angle is 5 degrees); "intersect" refers to two axes to be in a status of not being parallel or perpendicular to each other.

In some embodiments, in a case where the second optical axis II-II is parallel to the fourth optical axis IV-IV, in the extending direction of the third optical axis III-III, a first predetermined value of a distance between the second optical axis II-II of the illumination beams reflected by the reflector 1024 to the prism assembly 1026 and the fourth optical axis IV-IV of the projection beams reflected by the prism assembly 1026 to the projection lens 103 is in a range of 0 to 10 mm.

For example, in the direction of the Z-axis shown in FIG. 2, since the first optical axis I-I and the second optical axis II-II are perpendicular and intersecting, and the second optical axis II-II and the fourth optical axis IV-IV are parallel and there is a certain distance between them, the first optical axis I-I of the illumination beams in the light pipe 1022 and the lens assembly 1023 is perpendicular but do not intersect the fourth optical axis IV-IV of the projection lens 103. There is a certain distance between the first optical axis I-I and the fourth optical axis IV-IV, and a first predetermined value of the distance is in a range of 0 to 10 mm.

In a case where the laser projection apparatus works normally, the laser projection apparatus is usually placed in a way that: the fourth optical axis IV-IV of the projection lens 103 is parallel to a horizontal plane (i.e., a plane formed by the X-axis and the Y-axis in FIG. 2), and the fourth optical axis IV-IV of the projection lens 103 is perpendicular to a vertical direction (i.e., an extending direction of the Z-axis in FIG. 2, or a direction perpendicular to the ground-piston or a horizontal plane). In this case, in some embodiments of the present disclosure, the extending direction of the third optical axis III-III is the vertical direction. The first optical axes of the illumination beams in the light pipe 1022 and the lens assembly 1023 are perpendicular but do not intersect the third optical axis III-III (i.e., the vertical direction). The fourth optical axis IV-IV of the projection lens 103 is also perpendicular to the third optical axis III-III (i.e., the vertical direction). Therefore, there is a distance between the first optical axis I-I and the fourth optical axis IV-IV in the vertical direction, and the distance is allowed to be reduced to approximately zero or even to zero. In this way, a vertical distance between the lens assembly 1023 (or the light pipe 1022) and the projection lens 103 is reduced. A size of the laser projection apparatus in the vertical direction is effectively reduced. A structure of the laser projection apparatus is more compact. A volume of the laser projection apparatus is reduced. Space occupied by the laser projection apparatus is getting smaller.

In some embodiments, referring to FIG. 5, the prism assembly 1026 may include: a first prism 10261 and a second prism 10262.

The first prism 10261 is configured to receive the illumination beams reflected by the reflector 1024, and to reflect the received illumination beams to the beam receiving face 1025a of the DMD 1025. The illumination beams exiting from the first prism 10261 may pass through the second prism 10262 and is then projected on the beam receiving face 1025a of the DMD 1025. The beam receiving face 1025a of the DMD 1025 modulates the illumination beams into projection beams corresponding to image signals of the image to be displayed. The second prism 10262 is configured to receive the projection beams reflected by the beam receiving face 1025a, and to reflect the projection beams to the projection lens 103. It should be noted that an optical axis of the illumination beams entering the first prism (e.g., the second optical axis II-II) is parallel to an optical axis of the illumination beams reflected by the second prism to the projection lens 103 (e.g., the fourth optical axis IV-IV).

For example, as shown in FIG. 5, the first prism 10261 includes a first incident surface 10261a, a first exiting surface 10261b, and a first reflection surface 10261c. The first incident surface 10261a is configured to receive the illumination beams from the reflector 1024. The first exiting surface 10261b is configured to reflect the illumination beams received by the first incident surface 10261a to the first reflection surface 10261c, and to transmit the illumination beams reflected by the first reflection surface 10261c to the beam receiving face 1025a of the DMD 1025. The first reflection surface 10261c is configured to reflect the received illumination beams which are reflected by the first exiting surface 10261b again to the first exiting surface 10261b. The illumination beams are then transmitted to the beam receiving face 1025a of the DMD 1025 through the first exiting surface 10261b.

As shown in FIG. 5, the illumination beams provided by the laser source 101 may enter the first prism 10261 through the first incident surface 10261a of the first prism 10261, and is then reflected by the first exiting surface 10261b of the first prism 10261 to the first reflection surface 10261c, and is finally reflected by the first reflection surface 10261c and exits from the first prism 10261 through the first exiting surface 10261b.

In some embodiments, the first incident surface 10261a, the first exiting surface 10261b, and the first reflection surface 10261c may all be flat surfaces.

In some embodiments, the first incident surface 10261a and the first exiting surface 10261b may both be flat surfaces, and the first reflection surface 10261c may be a curved surface. In this case, the first reflection surface 10261c is also configured to shape the received illumination beams reflected by the first exiting surface 1021b.

For example, as shown in FIG. 5, the first reflection surface 10261c of the first prism 10261 is a curved surface. The first reflection surface 10261c may be configured to shape the illumination beams. That is, the first reflection surface 10261c may adjust a shape of the illumination beams, so that a shaping lens configured to shape the illumination beams and disposed between the laser source 101 and the prism assembly 1026 may be omitted. Therefore, the number of optical components in the laser projection apparatus may be reduced (for example, the shaping lens is omitted), the volume of the laser projection apparatus may be further reduced, and the space occupied by the laser projection apparatus is further reduced.

In some embodiments, in a case where the first reflection surface 10261c of the first prism 10261 is a curved surface, the first reflection surface 10261c may be a spherical reflective surface or an aspherical reflective surface. The embodiments of the present disclosure do not limit a structure of the curved surface of the first reflection surface 10261c of the first prism 10261, as long as the curved reflection surface 10261c can effectively reflect the illuminating beams entering the first prism 10261 to the beam receiving face 1025a of the DMD 1025.

For example, as shown in FIG. 5, the second prism 10262 includes a second incident surface 10262a, a second exiting surface 10262b, and a second reflection surface 10262c. The second incident surface 10262a is configured to receive the projection beams modulated by the beam receiving face 1025a of the DMD 1025. The second reflection surface 10262c is configured to reflect the projection beams received by the second incident surface 10262a to the second exiting surface 10262b. The second exiting surface 10262b is configured to transmit the projection beams reflected by the second reflection surface 10262c to the projection lens. The second incident surface 10262a, the second exiting surface 10262b and the second reflection surface 10262c may all be flat surfaces, and the second prism 10262 may be a triangular prism.

As shown in FIG. 5, the illumination beams exiting from the first prism 10261 pass through the second reflection surface 10262c of the second prism 10262 to enter the second prism 10262, and are projected onto the beam receiving face 1025a of the DMD 1025 after exiting from the second incident surface 10262a of the second prism 10262. The illumination beams are modulated by the beam receiving face 1025a of the DMD 1025 into the projection beams corresponding to the image signals and then the projection beams are reflected. The projection beams pass through the second incident surface 10262a of the second prism 10262 again along a reflected beam path to enter the second prism 10262, and are then reflected by the second reflection surface 10262c of the second prism 10262, and pass through the second exiting surface 10262b of the second prism 10262 to exit from the second prism 10262, and finally enter the projection lens 103.

It should be noted that an optical axis (e.g., the second optical axis II-II) of the illumination beams entering through the first incident surface 10261a of the first prism 10261 is parallel to an optical axis (e.g., the fourth optical axis IV-IV) of the projection beams exiting from the second exiting surface 10262b of the second prism 10262. For convenience of illustrating the beam path of the laser projection apparatus, the laser source 101 is not shown in FIG. 5.

It should be noted that, in the above embodiments, since the illumination beams can pass through the first exiting surface 10261b of the first prism 10261 and exit, the first exiting surface 10261b is capable of transmitting light.

Moreover, since the first exiting surface 10261b may also reflect the illumination beams, this reflection of the illumination beams on the first exiting surface 10261b is a total reflection. Similarly, since the illumination beams can pass through the second reflection surface 10262c of the second prism 10262 and enter the second prism 10262, the second reflection surface 10262c is capable of transmitting light. Moreover, since the second reflection surface 10262c may also reflect the projection beams, and this reflection of the projection beams on the second reflection surface 10262c is a total reflection.

In order to ensure that the total reflection can occur on both the first exiting surface 10261b and the second reflection surface 10262c, the following conditions must be satisfied. First, a refractive index of a medium in contact with the first exiting surface 10261b of the first prism 10261 must be smaller than that of the first prism 10261. Second, a refractive index of a medium in contact with the second reflection surface 10262c of the second prism 10262 must be smaller than that of the second prism 10262. However, the above two conditions cannot be satisfied simultaneously in a case where the first prism is in contact with the second prism (i.e., the first exiting surface 10261b is in contact with the second reflection surface 10262c). Therefore, there is a gap (e.g., air) between the second prism 10262 and the first prism 10261, and a refractive index of the gap is less than the refractive index of the first prism 10261 and less than the refractive index of the second prism 10262. In this case, the second prism 10262 and the first prism 10261 are spaced apart from each other by a distance.

Based on the above description, in a case where the laser projection apparatus works normally, the laser projection apparatus is usually placed in a way that: the fourth optical axis IV-IV of the projection lens 103 is parallel to the horizontal plane, and the fourth optical axis IV-IV of the projection lens 103 is perpendicular to the vertical direction. In this case, in the vertical direction, the smaller the distance between an optical axis of the illumination beams incident on the first prism 10261 (such as the second optical axis II-II) and an optical axis of the projection beams incident on the projection lens 103 after being reflected by the second prism 10262 (such as the fourth optical axis IV-IV) is, the smaller the size of the laser projection apparatus in the vertical direction is.

In this case, in order to further reduce the size of the laser projection apparatus in the vertical direction, a distance between the optical axis of the illumination beams incident on the first prism 10261 and the optical axis of the projection beams reflected by the second prism 10262 to the projection lens 103 may be further reduced to make the distance close to zero. That is, the optical axis of the illumination beams incident on the first prism 10261 is proximate to or coincident with the optical axis of the projection beams reflected by the second prism 10262 to the projection lens 103. In this case, in some embodiments, the prism assembly 1026 further includes: a third prism 10263. The third prism 10263 is configured to adjust an optical path distance of the illumination beams in the prism assembly 1026 (the optical path distance may be understood as a equivalent distance that light travels in a medium, and the equivalent distance in the medium is converted into a distance that light travels in a vacuum in a same period of time, so a value of the optical path distance is a product of a refractive index of the medium and a distance the light travels in the medium), and reduce the size of the laser projection apparatus in the vertical direction, which will be further explained later.

Figure 7:
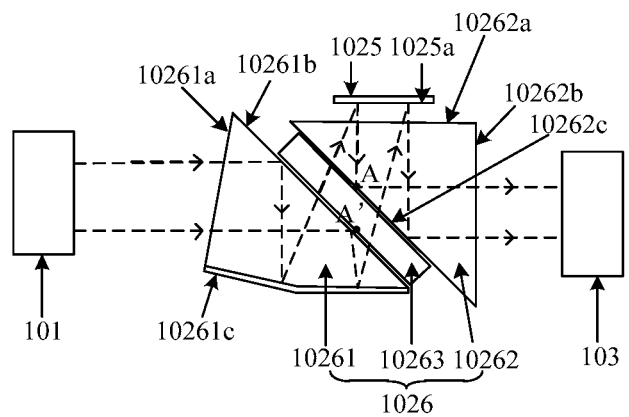
FIG. 7 is a schematic diagram showing a structure of a beam path of another laser projection apparatus, according to some embodiments of the present disclosure.

The third prism 10263 is located between the first prism 10261 and the second prism 10262. For example, as shown in FIG. 7, the third prism 10263 is located between the first exiting surface 10261b of the first prism 10261 and the second reflection surface 10262c of the second prism 10262. In FIG. 7, for convenience of illustrating the beam path of the laser projection apparatus, the light pipe 1022, the lens assembly 1023, and the reflector 1024 are not shown.

In order that a position of the illumination beams exiting the first prism 10261 and being projected on the beam receiving face 1025a is not changed, it is necessary to ensure that a first critical angle, which exists when a total reflection of the illumination beams on the first exiting surface 10261b (i.e., a surface proximate to the third prism 10263) of the first prism 10261 occurs, does not change, and it is necessary to ensure that a second critical angle, which exists when a total reflection of the projection beams on the second reflection surface 10262c (i.e., a surface proximate to the third prism 10263) of the second prism 10262 occurs, does not change. This requires that the refractive index of the medium in contact with the first exiting surface 10261b does not change and the refractive index of the medium in contact with the second exiting surface 10262c does not change. In this case, it is necessary to ensure that the third prism 10263 is not in contact with both the first prism 10261 and the second prism 10262. That is, there is a gap between the third prism 10263 and the first exiting surface 10261b of the first prism 10261, and a gap between the third prism 10263 and the second reflection surface 10262c of the second prism 10262. In this case, the third prism 10263 and the first exiting surface 10261b of the first prism 10261 are spaced apart from each other by a distance, and the third prism 10263 and the second reflection surface 10262c of the second prism 10262 are spaced apart from each other by a distance.

In some embodiments, the third prism 10263 may be fixedly connected to the first prism 10261 through a glue dotting method, and the third prism 10263 may be fixedly connected to the second prism 10262 through a glue dotting method.

In some embodiments, as shown in FIG. 7, a surface of the third prism 10263 facing the first prism 10261 is parallel to a surface of the third prism 10263 facing the second prism 10262. The third prism 10263 may be, for example, a flat prism.

As shown in FIG. 7, the illumination beams exiting the first prism 10261 pass through the third prism 10263 and the second prism 10262 in sequence, and are then projected on the beam receiving face 1025a of the DMD 1025. Since an optical path distance of the prism assembly 1026 is increased due to the third prism 10263, a reflection position of a projection beam reflected by the second reflection surface 10262c of the second prism 10262 is shifted upward in the vertical direction. For example, in FIG. 7, the reflection position is shifted upward from A' in a case there is not the third prism 10263 to A in a case there is the third prism 10263. The larger the thickness of the third prism 10263 is, the larger a displacement in the vertical direction of a reflection position of a projection beam reflected by the second reflection surface 10262c of the second prism 10262 is shifted upward is. Therefore, a distance between the optical axis of the illumination beams incident on the first prism 10261 and the optical axis of the projection beams exiting from the second prism 10262 may be appropriately adjusted in the vertical direction by arranging the third prism 10263, and it is possible to minimize the distance between the optical axis of the illumination beams incident on the first prism 10261 and the optical axis of the projection beams exiting from the second prism 10262 in the vertical direction, and the size of the laser projection apparatus in the vertical direction is further reduced.

In a case where the third prism 10263 is disposed, beam paths in the first prism 10261 and the second prism 10262 shown in FIG. 7 are the same as beam paths in the first prism 10261 and the second prism 10262 shown in FIG. 5, and may be referred to corresponding description of the beam paths in the first prism 10261 and the second prism 10262 shown in FIG. 5, and will not be repeated here.

In some embodiments, an illumination beam entering from the first prism 10261 to the third prism 10263 may be refracted, and an illumination beam entering from the third prism 10263 to the second prism 10262 may be refracted. In a case where the third prism 10263 is a flat prism, the thickness of the third prism 10263 may also be related to an incident angle of an illumination beam from the first prism 10261 and entering the third prism 10263, and the thickness of the third prism 10263 is selected to ensure that the illumination beam can still be projected onto the beam receiving face of the DMD 1025 after the illumination beam enters the third prism from the first prism and is refracted in the third prism.

Since the DMD 1025 is typically disposed on a circuit board 10251 (as shown by the dotted line in FIG. 5), and as shown in FIG. 5, a position of the first prism 10261 may be higher than a position of the second prism 10262 in the vertical direction, the first prism 10261 may easily interfere in position-wise with the circuit board 10251. By arranging the third prism 10263 between the first exiting surface 10261b of the first prism 10261 and the second reflection surface 10262c of the second prism 10262, as shown in FIG. 7, a horizontal distance between the first prism 10261 and the circuit board 10251 may be increased, so as to prevent the first prism 10261 from interacting with the circuit board 10251.

In the above embodiments, an illumination beam from the lens assembly 1023 is totally reflected by the first exiting surface 10261b of the first prism 10261, and a projection beam from the DMD 1025 is totally reflected by the second reflection surface 10262c of the second prism 10262. Conditions for a total reflection are as follows. First, a beam enters an optically denser medium from an optically thinner medium. Second, an incident angle is greater than or equal to a critical angle. What is optically denser medium and what is optically thinner medium are relative. A refractive index of a beam in the optically denser medium is greater than a refractive index of the beam in the optically thinner medium. The critical angle θ satisfies: θ=arcsin(n2/n1). n1 is a refractive index of the optically denser medium, and n2 is a refractive index of the optically thinner medium. In the above embodiments, in order that a beam incident on the first exiting surface 10261b of the first prism 10261 and a beam on the second reflection surface 10262c of the second prism 10262 may be totally reflected, an incident angle of the beam incident on the first exiting surface 10261b and an incident angle on the second reflection surface 10262c need to satisfy the following conditions.

Taking the second reflection surface 10262c of the second prism 10262 as an example, the incident angle of the beam on the second reflection surface 10262c is greater than or equal to a critical angle θ. The critical angle θ satisfies: θ=arcsin(n2/n1), n1 is the refractive index of the second prism 10262, and n2 is a refractive index of air.

Figure 8:
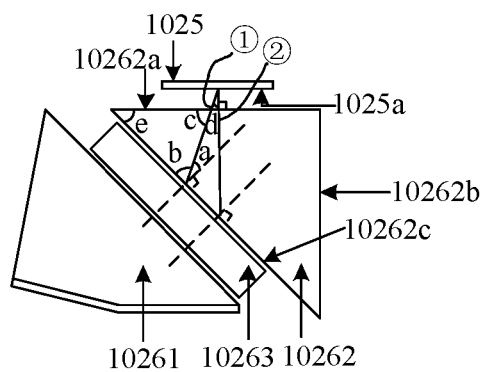
FIG. 8 is a schematic diagram of a total reflection of a laser beam in a prism assembly, according to some embodiments of the present disclosure.

Referring to FIG. 8, since the second prism 10262 is an axisymmetric total reflection prism, an included angle between the second incident surface 10262a and the second reflection surface 10262c is 45 degrees (i.e., an included angle e in FIG. 8), and an included angle between the second exiting surface 10262b and the second reflection surface 10262c is 45 degrees, and an included angle between the second incident surface 10262a and the second exiting surface 10262b is 90 degrees. In FIG. 8, the straight line ① is a beam reflected from the beam receiving face 1025a of the DMD 1025 to the second reflection surface 10262c. The straight line ② is a normal of the beam receiving face 1025a of the DMD 1025 (a mirror surface of each micromirror forming the beam receiving face 1025a in the DMD 1025 shown in FIG. 8 is parallel to the horizontal plane). "a" is an incident angle of the beam ① onto the second reflection surface 10262c. "b" is a complementary angle of a. "d" is an included angle between the beam ① and the normal ②. d satisfies: $d=(1/2)\arcsin(1/(2*F))$, F is an illumination parameter of DMD 1025. F is generally a ratio of a focal length of the projection lens 103 to a clear aperture of the projection lens 103. In the laser projection apparatus, the illumination parameter F of the DMD 1025 needs to be matched with the F of the projection lens 103 to ensure that the transmission of a beam with a high light utilization rate. "c" is a complementary angle of d. According to a geometric meaning of the beam path shown in FIG. 8, it can be determined that: $b+c+e=180°$, $a+b=90°$, $c+d=90°$. Therefore, $b+c=180°-e=180°-45°=135°$, and $a=90°-b$, $b=135°-c$, $c=90°-d$. According to the above formula, it can be determined that $a=90°-b=90°-(135°-c)=90°-(135°-(90°-d))=45°-d$, and the incident angle "a" satisfies: $a=45°-(1/2)\arcsin(1/(2*F))$.

According to the conditions of the total reflection: $a \geq \theta$. That is, $45°-(1/2)\arcsin(1/(2*F)) \geq \arcsin(n2/n1)$. That is, a refractive index n1 of the second prism 10262 needs to satisfy: $n1 \geq n2/\sin(45°-(1/2)\arcsin(1/(2*F)))$. Corresponding to the prism assembly 1026, n2 is the refractive index of air, so n2 may take the value 1 (the refractive index of air is 1), and the refractive index n1 of the second prism 10262 satisfies: $n1 \geq 1/\sin(45°-(1/2)\arcsin(1/(2*F)))$.

For example, in a case where the illumination parameter F of the DMD 1025 takes the value 2, the refractive index n1 of the second prism 10262 satisfies: $n1 \geq 1/\sin(45°-(1/2)\arcsin(1/4))$, That is, $n1 \geq 1.63$. For example, in some examples, n1 may take the value 1.74.

In a case where n1 takes the value 1.63, $\theta=\arcsin(1/1.63) \approx 37°$. It can be seen that, in order to ensure that the projection beam may be totally reflected on the second reflection surface 10262c of the second prism 10262, the incident angle "a" is at least 37 degrees.

A calculation of the incident angle of the illumination beam in the first prism 10261 on the first exiting surface 10261b is similar to that of the incident angle of the projection beam in the second prism 10262 on the second reflection surface 10262c, which may refer to corresponding description of the calculation of the incident angle of the projection beam on the second reflection surface 10262c in the second prism 10262, and will not be repeated here.

The refractive index of the first prism 10261 and the refractive index of the second prism 10262 may be simulated according to an optical design software. The refractive index of the first prism 10261 may cause the illumination beams to be totally reflected by the first exiting surface 10261b of the first prism 10261 after entering the first prism 10261 from the first incident surface 10261a of the first prism 10261. The refractive index of the second prism 10262 may cause the projection beams to pass through the second incident surface 10262a of the second prism 10262 and then irradiate on the second reflection surface 10262c of the second prism 10262 at an incident angle greater than or equal to the critical angle and finally are totally reflected to the projection lens 103 by the second reflection surface 10262c of the second prism 10262.

In some embodiments, the refractive index of the first prism 10261, the refractive index of the second prism 10262, and the refractive index of the third prism 10263 may be the same. The first prism 10261, the second prism 10262, and the third prism 10263 may be made of a same material. Generally, the first prism 10261 and the third prism 10263 may adopt a same material to ensure a same thermal expansion coefficient of the two. In some embodiments, all of the refractive indexes of the first prism 10261, the second prism 10262, and the third prism 10263 are different, and the first prism 10261, the second prism 10262, and the third prism 10263 may be made of different materials. Generally, thermal expansion coefficients of three materials that make the first prism 10261, the second prism 10262, and the third prism 10263 should not differ too much. Otherwise, it is difficult to ensure the reliability of the structure and position of the prism assembly 1026.

In some embodiments, the refractive index of the first prism 10261 and the refractive index of the third prism 10263 are the same, and the refractive index of the first prism 10261 and the refractive index of the second prism 10262 are different. In some embodiments, the refractive index of the first prism 10261 may be in a range of 1.4 to 1.55. The refractive index of the third prism 10263 may be in a range of 1.4 to 1.55. The refractive index of the second prism 10262 may be in a range of 1.55 to 1.7.

For example, the refractive index of the first prism 10261 and the refractive index of the third prism 10263 may be 1.49, and the refractive index of the second prism 10262 may be 1.65.

In some embodiments, the refractive index of the second prism 10262 is greater than the refractive index of the first prism 10261. Therefore, compared with the first prism 10261, the second prism 10262 can deflect the illumination beams to a greater extent, which is beneficial to shorten a distance that beams travel from the DMD 1025 to a first lens of the projection lens 103 (e.g., a lens of the projection lens 103 most proximate to the second prism 10262). In this way, in a case where a back focus length is determined (that is, an optical path distance from the DMD 1025 to the projection lens 103 is determined), a strong deflection ability (i.e., a large refractive index) of the second prism 10262 is more advantageous for the first lens of the projection lens 103 to adopt a lens having a small volume (the optical path distance is a product of the refractive index of the medium and a distance that the beams travel in the medium). Therefore, a purpose of the beams exiting from the projection lens 103 to a preset position is achieved, and the volume of the laser projection apparatus may be further reduced.

Generally, in order to eliminate chromatic aberration of an optical system, an optical medium is required to have a large dispersion coefficient (also referred to as Abbe number). In order to reduce the chromatic aberration of the optical system, that is, reduce an influence of chromatic aberration of three primary color beams, and improve uniformity of the beams, the Abbe number of the second prism 10262 is generally required to be the same as the Abbe number of the projection lens 103. The Abbe number of an optical medium is inversely proportional to the refractive index of the optical medium (that is, the larger the refractive index is, the more pronounced the dispersion is, and the smaller the Abbe number is). Therefore, it can be seen that a value of the refractive index of the second prism 10262 cannot be too large. Based on this, the refractive index of the second prism 10262 is limited to a range of 1.55 to 1.7, such as 1.55, 1.58, 1.6, 1.63, 1.65, 1.68, and 1.7. In this way, in a case where the chromatic aberration of the laser projection apparatus meets the requirements, a relatively large refractive index of the second prism 10262 may be selected to reduce the volume of the second prism 10262, and the volume of the laser projection apparatus is further reduced.

In some embodiments, the second optical axis II-II intersects the fourth optical axis IV-IV, and a second predetermined value of an included angle between the illumination beams incident on the first incident surface 10261a of the first prism 10261 (i.e., the second optical axis II-II) and the projection beams exiting from the second exiting surface 10262b of the second prism 10262 (i.e., the fourth optical axis IV-IV) is in a range of 0 to 20 degrees. That is, the included angle between the illumination beams incident on the first incident surface 10261a of the first prism 10261 and the projection beams exiting from the second exiting surface 10262b of the second prism 10262 is less than or equal to 20 degrees, so as to ensure that the included angle between the optical axis of the illumination beams incident on the first incident surface 10261a of the first prism 10261 and the optical axis of the projection beams emitting from the second exiting surface 10262b of the second prism 10262 is not too large. The included angle between the optical axis of the illumination beams entering the prism assembly 1026 (i.e., the second optical axis II-II) and the fourth optical axis IV-IV of the projection beams entering the projection lens 103 from the prism assembly 1026 needs to be as small as possible (ideally, zero), in a case where the second optical axis II-II and the fourth optical axis IV-IV intersect each other, so that a layout of the laser projection apparatus is more compact, and the space occupied by the laser projection apparatus is reduced.

In some examples, the included angle between the optical axis (the second optical axis II-II) of the illumination beams incident on the first incident surface 10261a of the first prism 10261 and the optical axis (the fourth optical axis IV-IV) of the projection beams exiting from the second exiting surface 10262b of the second prism 10262 is 0, 10 degrees, 20 degrees, etc. In a case where the included angle is equal to 0, the illumination beams incident on the first incident surface 10261a of the first prism 10261 and the projection beams exiting from the second exiting surface 10262b of the second prism 10262 may be parallel or coincide.

In some embodiments, a cross section (a section obtained by cutting the second prism 10262 by a plane parallel to the paper surface) of the second prism 10262 may be a right triangle. Of course, the cross section of the second prism 10262 may also be an acute triangle or an obtuse triangle, which is not limited in the embodiments of the present disclosure. For example, the cross section of the second prism 10262 may be an isosceles right triangle.

In some embodiments, the light pipe 1022 has a beam inlet and a beam outlet. The illumination beams from the laser source 101 enter the light pipe 1022 through the beam inlet, and then emit from the beam outlet after being homogenized by the light pipe 1022. After being amplified first and then converged by the lens assembly 1023, the illumination beams enter the prism assembly 1026 and are reflected by the prism assembly 1026 to the beam receiving face 1025a of the DMD 1025. In this case, in some embodiments, in order to ensure that the illumination beams that are first amplified and then converged by the lens assembly 1023 can completely cover the beam receiving face 1025a of the DMD 1025, a product of a size of a diagonal of the beam outlet of the light pipe 1022 and a magnification of the lens assembly 1023 is equal to a size of a diagonal of the DMD 1025.

For example, if a shape of the beam receiving face 1025a of the DMD 1025 is a rectangle, the size of the diagonal of the beam receiving face 1025a of DMD 1025 is calculated as follows. The size of the diagonal of the beam receiving face 1025a of the DMD 1025 is $\sqrt{x1^2+y1^2}$, In a case where a length of the rectangle is x1, and a width of the rectangle is y1.

In some embodiments, the magnification of the lens assembly 1023 is in a range of 1.9 to 2.

For example, in the case where the shape of the beam receiving face 1025a of the DMD 1025 is a rectangle, if a length of the beam receiving face 1025a of the DMD 1025 is 14.6664 mm, and a width of the beam receiving face 1025a of the DMD 1025 is 8.252 mm, then the size of the diagonal of the beam receiving face 1025a of the DMD 1025 is approximately 16.83 mm. If the magnification of the lens assembly 1023 is 1.9, the size of the diagonal of the beam outlet of the light pipe 1022 satisfies that: 16.86 mm÷1.9=8.87 mm.

For example, in a case where a length of the beam outlet of the light pipe 1022 is 7.7 mm, a width of the light pipe 1022 may be 4.4 mm ($\sqrt{7.7mm^2+4.4mm^2}\approx 8.87$ mm).

In some embodiments, the projection lens 103 is an ultra-short-focus lens. In the vertical direction, a distance between the second optical axis II-II of the illumination beams incident on the prism assembly 1026 and the fourth optical axis IV-IV of the projection lens 103 is in a range of 5.464 mm to 5.7758 mm. For example, the distance between the second optical axis II-II of the illumination beam incident on the prism assembly 1026 and the fourth optical axis IV-IV of the projection lens 103 may be 5.5283 mm.

In some embodiments, as shown in FIG. 6, the lens assembly 1023 includes two lenses, such as a first lens 10231 and a second lens 10232. The first lens 10231 and the second lens 10232 are located in sequence between the light pipe 1022 and the first incident surface 10261a of the first prism 10261, and the first lens 10231 is more proximate to the light pipe 1022 relative to the second lens 10232.

As shown in FIG. 6, the first lens 10231 is configured to perform a first contraction of the received illumination beams homogenized by the light pipe 1022. It should be noted that, before the illumination beams pass through the first lens 10231, they first enter the light pipe 1022 from the beam inlet of the light pipe 1022, and then emit from the beam outlet of the light pipe 1022 and are directed to the first lens 10231. Since an area of a spot of the illumination beams after passing through the first lens 10231 is greater than an area of a spot of the illumination beams passing through the beam outlet, the first lens 10231 actually amplifies the illumination beams.

As shown in FIG. 6, the second lens 10232 is configured to perform a second contraction of the received illumination beams that are amplified by the first lens 10231. It should be noted that, since an area of a spot of the illumination beams after passing through the second lens 10232 is less than an area of a spot of the illumination beams (which may also be treated as the illumination beams after passing through the first prism 10231) before entering the second lens 10232, the second lens 10232 actually converges the illumination beams.

In some embodiments, the first lens 10231 and the second lens 10232 may be spherical lenses, or may be aspherical lenses. For example, the first lens 10231 may be an aspherical concave convex lens (i.e., positive meniscus lens), and the second lens 10232 may be an aspheric biconvex lens.

In some embodiments, the first lens 10231 includes a first face proximate to the light pipe 1022 and a second face away from the light pipe 1022. The first face protrudes toward the second face, and a protruding direction of the second face is the same as a protruding direction of the first face. The second lens 10232 includes a third face proximate to the light pipe 1022 and a fourth face away from the light pipe 1022. The third face protrudes in a direction away from the fourth face, and a convex direction of the fourth face is opposite to a convex direction of the third face.

For example, as shown in FIG. 6, in a case where the first lens 10231 is a concave convex lens, the first face of the first lens 10231 proximate to the light pipe 1022 protrudes toward a side away from the light pipe 1022, the second face of the first lens 1022 also protrudes toward the side away from the light pipe 1022, and an absolute value of curvature of the second face is greater than an absolute value of curvature of the first face. The larger the absolute value of the curvature is, the larger the degree of protrusion is. In a case where the second lens is a biconvex lens, the third face of the second lens 10232 proximate to the light pipe 1022 protrudes toward a side proximate to the light pipe 1022, and the fourth face of the second lens 10232 away from the light pipe 1022 protrudes toward a side away from the light pipe 1022.

In some embodiments, a curvature of the first face of the first lens 10231 proximate to the light pipe 1022 may be in a range of −25 to −35, such as −20, −25, −30, −35. A curvature of the second face of the first lens 10231 away from the light pipe 1022 may be in a range of −25 to −40, such as −25, −30, −35, −40. As shown in FIG. 6, protruding directions of the first face and the second face of the first lens 10231 are the same as a propagation direction of the beams, so their curvatures are both negative.

In some embodiments, a curvature of the third face of the second lens 10232 proximate to the light pipe 1022 may be in a range of 10 to 30. For example, the curvature of the third face is 10, 15, 20, and 30. A curvature of the fourth face of the second lens 10232 away from the light pipe 1022 may be in a range of −20 to −30. For example, the curvature of the fourth face is −20, −25, −28, and −30. As shown in FIG. 6, a protruding direction of the third face of the second lens 10232 is opposite to the propagation direction of the beams, so the curvature thereof is positive. A protruding direction of the fourth face of the second lens 10232 is the same as the propagation direction of the beams, so the curvature thereof is negative.

In some examples, the curvature of the first face of the first lens 10231 proximate to the light pipe 1022 is, for example, −23.13, and the curvature of the second face of the first lens 10231 away from the light pipe 1022 is, for example, −31.4. The curvature of the third face of the second lens 10232 proximate to the light pipe 1022 is, for example, 18.23, and the curvature of the fourth face of the second lens 10232 away from the light pipe 1022 is, for example, −25.6.

In some embodiments, the illumination beams converged by the second lens 10232 is parallel to an extending direction of the light pipe 1022. That is, an optical axis of the illumination beams emitting from the second lens 10232 is parallel to an optical axis of the second lens 10232, which ensures that the illumination beams may enter the first prism 10261 from the first incident surface 10261*a* of the first prism 10261 after being reflected by the reflector 1024, and then be reflected by the first exiting surface 10261*b* of the first prism 10261. Of course, the illumination beams after being converged by the second lens 10232 may also have a certain included angle with the extending direction of the light pipe 1022, as long as the illumination beams can be reflected by the first exiting surface 10261*b* of the first prism 10261.

In some embodiments, since the DMD 1025 easily generates heat during operation, the laser projection apparatus may further include a cooling component. In some embodiments of the present disclosure, on the basis of the way the laser projection apparatus being placed when normally works (referring to the above description, and the description is not repeated here), since a perpendicular bisector of the DMD 1025 is parallel to the vertical direction, the cooling component may be disposed on a side of the DMD 1025 away from the beam receiving face 1025*a* along the vertical direction. That is, taking a direction away from the ground as an upper direction, and taking a direction proximate to the ground as an lower direction, the cooling component is disposed above the DMD 1025. In this case, although the cooling component has a certain weight in the vertical direction, the DMD 1025 and the housing 1021 can have a bearing effect on the cooling component in the vertical direction. Therefore, the cooling component is less likely to shift or fall off due to its own weight, and is reliably fixed.

In some embodiments, the DMD 1025 adopts a liquid-cooling manner to dissipate heat. The cooling component may be a flat-plate liquid-cooling radiator (also called a cooling head), which has a small volume and can effectively reduce space occupied by the optical engine 102. Therefore, the volume of the laser projection apparatus is reduced. In addition, a cooling component of the DMD 1025 and a cooling component of the laser source 101 may also be connected in series. That is, the cooling component of the DMD 1025 and the cooling component of the laser source 101 may be a common-used cooling component, so as to further reduce space occupied by the cooling component, the space occupied by the optical engine 102, and the volume of the laser projection apparatus.

Figure 9:
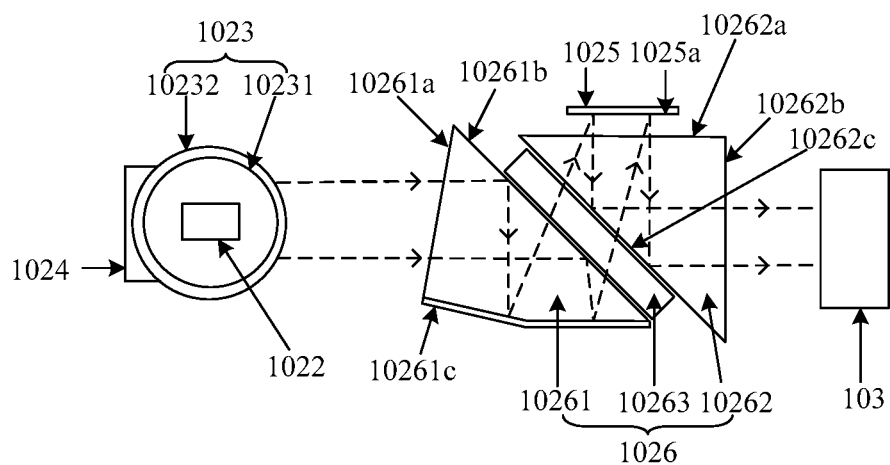
FIG. 9 is a schematic diagram showing a structure of a beam path of yet another laser projection apparatus, according to some embodiments of the present disclosure.

In summary, referring to FIG. 9, in a laser projection apparatus provided by some embodiments of the present disclosure, according to a manner in which the laser projection apparatus is placed during normal operation, the fourth optical axis IV-IV of the projection lens 103 is parallel to the horizontal plane, and the fourth optical axis IV-IV of the projection lens 103 is perpendicular to the vertical direction. In this case, some embodiments of the present disclosure set the extending direction of the third optical axis III-III as the vertical direction, so that the first optical axes of the illumination beams in the light pipe 1022 and the lens assembly 1023 are perpendicular to the third optical axis III-III (i.e., vertical direction), the fourth optical axis IV-IV of the projection lens 103 is perpendicular to the third optical axis III-III, and the distance between the first optical axis I-I and the fourth optical axis IV-IV in the vertical direction (the first optical axis I-I and the fourth optical axis IV-IV are perpendicular but do not intersect) may be reduced to approximately zero or even zero. In this way, a distance between the lens assembly 1023 and the projection lens 103 in the vertical direction may be effectively reduced, and the size of the laser projection apparatus in the vertical direction is effectively reduced. In addition, in some embodiments of the present disclosure, by arranging the third prism 10263 in the prism assembly, the laser source 101, the lens assembly 1023, the prism assembly 1026, and the projection lens 103 are all located on a same horizontal plane. Therefore, the structure of the laser projection apparatus is more compact, the volume of laser projection apparatus is reduced, and the space occupied by the laser projection apparatus is reduced.

The foregoing descriptions are merely some specific implementation manners of the present disclosure, but the protection scope of the present disclosure is not limited thereto, and the changes or replacements that any person skilled in the art can easily think of in the technical scope disclosed by the present disclosure should be within the protection scope of the present disclosure. Therefore, the protection scope of the present disclosure shall be determined by the protection scope of the claims.

What is claimed is:

1. A laser projection apparatus, comprising:
   a laser source configured to provide an illumination beam;
   an optical engine configured to modulate the illumination beam according to an image signal to form a projection beam; and
   a projection lens configured to project the projection beam for imaging; wherein
   the optical engine includes a light pipe, a lens assembly, a reflector, a prism assembly, and a digital micromirror device;
   the light pipe is configured to receive the illumination beam and homogenize the illumination beam;
   the lens assembly is configured to first amplify and next converge the homogenized illumination beam, and then transmit the illumination beam to the reflector;
   the reflector is configured to reflect the illumination beam to the prism assembly;
   the digital micromirror device includes a beam receiving face facing the prism assembly, and is configured to modulate the illumination beam according to the image signal to form the projection beam;
   the prism assembly is configured to transmit the illumination beam to the beam receiving face of the digital micromirror device, and receive the projection beam reflected by the beam receiving face, and transmit the projection beam to the projection lens;
   an optical axis of the illumination beam transmitted by the light pipe and the lens assembly is a first optical axis, an optical axis of the illumination beam reflected by the reflector to the prism assembly is a second optical axis, the first optical axis is perpendicular to the second optical axis, and both the first optical axis and the second optical axis are parallel to the beam receiving face of the digital micromirror device.

2. The laser projection apparatus according to claim 1, wherein an optical axis of the projection beam reflected by the digital micromirror device to the prism assembly is a third optical axis, and an optical axis of the projection beam reflected by the prism assembly to the projection lens is a fourth optical axis;
   the second optical axis is perpendicular to the third optical axis, and the first optical axis is perpendicular to the third optical axis but does not intersect the third optical axis; and
   the second optical axis is parallel to the fourth optical axis and a distance between the second optical axis and the fourth optical axis is less than a first predetermined value, or the second optical axis intersects the fourth optical axis and an included angle between the second optical axis and the fourth optical axis is less than a second predetermined value.

3. The laser projection apparatus according to claim 2, wherein in an extending direction of the third optical axis, the first predetermined value of a distance between the second optical axis of the illumination beam reflected by the reflector to the prism assembly and the fourth optical axis of the projection beam reflected by the prism assembly to the projection lens is in a range of 0 to 10 mm.

4. The laser projection apparatus according to claim 2, wherein in an extending direction of the third optical axis, the second predetermined value of an included angle between the second optical axis of the illumination beam reflected by the reflector to the prism assembly and the fourth optical axis of the projection beam reflected by the prism assembly to the projection lens is in a range of 0 to 20 degrees.

5. The laser projection apparatus according to claim 1, wherein the prism assembly includes a first prism and a second prism;
   the first prism is configured to receive the illumination beam from the reflector, and reflect the illumination beam to the beam receiving face of the digital micromirror device; wherein the illumination beam exiting from the first prism passes through the second prism and enters the beam receiving face of the digital micromirror device;
   the second prism is configured to receive the projection beam reflected by the beam receiving face, and reflect the projection beam to the projection lens; and
   the second prism and the first prism are spaced apart from each other.

6. The laser projection apparatus according to claim 5, wherein the first prism includes a first incident surface, a first exiting surface, and a first reflection surface; wherein
   the first incident surface is configured to receive the illumination beam from the reflector;
   the first exiting surface is configured to reflect the illumination beam received by the first incident surface to the first reflection surface, and transmit the illumination beam reflected by the first reflection surface to the beam receiving face of the digital micromirror device; and
   the first reflection surface is configured to reflect the received illumination beam reflected by the first exiting surface to the first exiting surface, wherein the illumination beam is transmitted through the first exiting surface to the beam receiving face of the digital micromirror device.

7. The laser projection apparatus according to claim 6, wherein the first incident surface and the first exiting surface are flat surfaces, and the first reflection surface is a curved surface; and
   the first reflection surface is further configured to shape the received illumination beam reflected by the first exiting surface.

8. The laser projection apparatus according to claim 5, wherein the second prism includes a second incident surface, a second exiting surface and a second reflection surface; wherein
   the second incident surface is configured to receive the projection beam obtained from a modulation by the beam receiving face of the digital micromirror device;
   the second reflection surface is configured to reflect the projection beam received by the second incident surface to the second exiting surface; and
   the second exiting surface is configured to transmit the projection beam reflected by the second reflection surface to the projection lens.

9. The laser projection apparatus according to claim 8, wherein the second incident surface, the second exiting surface, and the second reflection surface are all flat surfaces.

10. The laser projection apparatus according to claim 5, wherein the prism assembly further includes a third prism;
the third prism is located between a first exiting surface of the first prism and a second reflection surface of the second prism, the third prism and the first prism are spaced apart from each other, and the third prism and the second prism are spaced apart from each other; and
the illumination beam exiting from the first prism passes through the third prism and the second prism in sequence and enters the beam receiving face of the digital micromirror device.

11. The laser projection apparatus according to claim 10, wherein
the first prism includes a triangular prism, and a side face of the triangular prism is a curved surface;
the second prism includes a triangular prism; and
the third prism includes a flat prism.

12. The laser projection apparatus according to claim 10, wherein,
a refractive index of the first prism is in a range of 1.4 to 1.55,
a refractive index of the second prism is in a range of 1.55 to 1.7, and
a refractive index of the third prism is in a range of 1.4 to 1.55.

13. The laser projection apparatus according to claim 5, wherein a refractive index n1 of the second prism satisfies: n1≥1/sin(45°−(1/2)arcsin(1/(2*F)));
wherein F is an illumination parameter of the digital micromirror device.

14. The laser projection apparatus according to claim 1, wherein
the light pipe has a beam inlet and a beam outlet;
the illumination beam from the laser source enters the light pipe from the beam inlet, and is homogenized by the light pipe and then exits from the beam outlet; and
a product of a size of a diagonal of the beam outlet of the light pipe and a magnification of the lens assembly is equal to a size of a diagonal of the digital micromirror device.

15. The laser projection apparatus according to claim 14, wherein the magnification of the lens assembly is in a range of 1.9 to 2.

16. The laser projection apparatus according to claim 1, wherein the lens assembly includes a first lens and a second lens;
the first lens is located between the light pipe and the second lens, and is configured to receive the illumination beam from the light pipe and perform a first contraction to the illumination beam; and
the second lens is located between the first lens and the reflector, and is configured to receive the illumination beam from the first lens and perform a second contraction to the illumination beam.

17. The laser projection apparatus according to claim 16, wherein
the first lens includes a first face proximate to the light pipe and a second face away from the light pipe, the first face protrudes toward the second face, and a protruding direction of the second face is the same as a protruding direction of the first face; and
the second lens includes a third face proximate to the light pipe and a fourth face away from the light pipe, the third face protrudes away from the fourth face, and a protruding direction of the fourth face is opposite to a protruding direction of the third face.

18. The laser projection apparatus according to claim 17, wherein an absolute value of a curvature of the second face of the first lens is greater than an absolute value of a curvature of the first face of the first lens.

19. The laser projection apparatus according to claim 1, further comprising a housing, wherein
the light pipe, the lens assembly and the reflector are located at a bottom side inside the housing, and geometric centers of the light pipe, the lens assembly and the reflector are approximately in a same plane; and
the digital micromirror device is located at a top side inside the housing, and is disposed opposite to the prism assembly.

20. The laser projection apparatus according to claim 1, further comprising a housing, the housing including an opening, wherein
the light pipe, the lens assembly and the reflector are located at a bottom side inside the housing, and geometric centers of the light pipe, the lens assembly and the reflector are approximately in a same plane; and
the digital micromirror device is located outside the housing, the beam receiving face of the digital micromirror device is exposed to an inside of the housing through the opening, and the beam receiving face is disposed opposite to the prism assembly.

* * * * *